United States Patent
Chen et al.

(10) Patent No.: US 7,987,268 B2
(45) Date of Patent: Jul. 26, 2011

(54) METHODS AND SYSTEMS FOR DYNAMICALLY RECONFIGURABLE LOAD BALANCING

(75) Inventors: Huamin Chen, Shrewsbury, MA (US); Arun Kwangil Iyengar, Yorktown Heights, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1853 days.

(21) Appl. No.: 10/693,238

(22) Filed: Oct. 23, 2003

(65) Prior Publication Data
US 2005/0091344 A1    Apr. 28, 2005

(51) Int. Cl.
*G06F 15/16* (2006.01)
(52) U.S. Cl. .......................... 709/226; 709/203; 709/219
(58) Field of Classification Search .................. 709/203, 709/207, 226, 240
See application file for complete search history.

(56) References Cited

U.S. PATENT DOCUMENTS

| | | | |
|---|---|---|---|
| 6,442,603 B1 * | 8/2002 | Borella ........................ | 709/218 |
| 6,785,769 B1 * | 8/2004 | Jacobs et al. ................. | 711/118 |
| 6,804,717 B1 * | 10/2004 | Bakshi et al. ................ | 709/225 |
| 7,020,697 B1 * | 3/2006 | Goodman et al. ............ | 709/223 |
| 2004/0003080 A1 * | 1/2004 | Huff .............................. | 709/225 |
| 2004/0208120 A1 * | 10/2004 | Shenoi ......................... | 370/229 |

FOREIGN PATENT DOCUMENTS

WO    W00133349    5/2001

OTHER PUBLICATIONS

A. Nartovich et al., "WebSphere Application Server Enterprise Edition 4.0, A Programmer's Guide," Chapter 3, IBM Redbooks, 258 pages, Feb. 2002.
I. Rouvellou et al., "Extending Business Objects with Business Rules," Proceedings of the 33rd International Conference on Technology of Object-Oriented Languages and Systems, Mont Saint-Michel/St-Malo, France, IEEE Computer Society Press, 12 pages, Jun. 2000.

* cited by examiner

*Primary Examiner* — Ario Etienne
*Assistant Examiner* — El Hadji Sall
(74) *Attorney, Agent, or Firm* — Preston J. Young; Ryan, Mason & Lewis, LLP

(57) ABSTRACT

Techniques for serving data to a plurality of clients in a client-server environment are provided. In one aspect of the invention, the technique provides a plurality of versions of data in which different versions have different overheads associated therewith. Individual clients are assigned to one of a plurality of quality-of-service classes. Requests are satisfied so that a client belonging to a high quality-of-service class is given preferential access to data versions which require higher overheads to serve.

31 Claims, 10 Drawing Sheets

METHODS AND SYSTEMS FOR DYNAMICALLY RECONFIGURABLE LOAD BALANCING

FIELD OF THE INVENTION

The present invention relates to techniques for managing content requests in accordance with an information system, and, more particularly, to techniques for dynamically reconfigurable load balancing.

BACKGROUND OF THE INVENTION

It is known that the amount of dynamic content on information systems such as the Internet or World Wide Web (WWW or the "web") is increasing at a rapid pace. Web sites typically deploy databases for generating dynamic content. Requests come into a front end and are routed to one or more back-end databases. The overhead for satisfying requests from back-end databases can be high. High-performance web sites typically have multiple back-end databases. However, a problem exists regarding how to route requests (including balancing the request load) to multiple back-end databases, as well as other back end-systems such as messaging/transaction systems, server programs for creating data on-the-fly, etc.

Existing web servers have limited support in performance improvement and Quality-of-Service (QoS) provisioning to access the back-end systems. For example, existing techniques include connection pooling and (possible) server pooling. Connection pooling maintains open connections to the back-end systems and schedules queries in the pooled connections. As a result, the connection overhead in the web applications is reduced. However, this technique has no mechanisms to support load balancing and QoS provisioning.

Moreover, it is difficult to make the web servers unaware of the back-end system configurations without changing the existing applications. Existing protocols, such as the Java Data Base Connectivity (JDBC) protocol, that enable web servers to communicate with the back-end systems typically accept only one system as a data source. Thus, the web server is statically configured to use one back-end system. When configurations such as the server capacity and QoS policy of the back-end systems change, appropriate changes must be made to the web applications to reflect such changes.

Thus, a need exists for techniques which overcome the above-mentioned and other limitations associated with existing load balancing and QoS routing approaches.

SUMMARY OF THE INVENTION

The present invention provides techniques for managing content requests in accordance with an information system.

In a first aspect of the invention, a technique for serving data to a plurality of clients in a client-server environment, comprises the following steps/operations. A plurality (e.g., two or more) of versions of data are provided in which at least two versions have different overheads associated therewith. Individual clients are assigned to one of a plurality of quality-of-service classes. Requests are satisfied so that a client belonging to a high quality-of-service class is given preferential access to data versions which require higher overheads to serve.

Further, the overhead to serve a version may be correlated with a quality of the version. The multiple versions may comprise images of different resolutions and clients belonging to a high quality-of-service class are given preferential access to higher resolution images. The quality of a version may be correlated with a processing time required to create the version. The overhead to serve a version may be correlated with how current the version is. The technique may further comprise, in response to a system load exceeding a threshold, satisfying a higher percentage of requests from clients belonging to a lower quality-of-service class with a version requiring lower overhead to serve. The server may comprise multiple nodes and different nodes may provide data versions requiring different overheads to serve.

Still further, the technique may comprise implementing a quality-of-service policy that specifies at least one of content quality and latency. One or more clients belonging to a premium service class may be served with high content quality and low latency. One or more clients belonging to a medium service class may be served with one of high content quality and low latency. One or more clients belonging to a best-effort service class may be served with unspecified content quality and latency.

A client request may be routed using an identity of the client, a quality of content, a load on at least one server, a data distribution on at least one server, and/or a capacity of at least one server.

In a second aspect of the invention, a system comprises a plurality of clients, each client belonging to a quality-of-service class; a load balancer for sending requests from clients to at least one back-end server; and at least one back-end server for providing a plurality of versions of different objects in which at least two versions of an object have different overheads associated therewith.

In a third aspect of the invention, a method of providing a data serving service, comprises a service provider: (i) providing a plurality of versions of data in which at least two versions have different overheads associated therewith; (ii) assigning individual clients to one of a plurality of quality-of-service classes; and (iii) satisfying requests so that a client belonging to a high quality-of-service class is given preferential access to data versions which require higher overheads to serve.

In a fourth aspect of the invention, a technique for serving data to a plurality of clients comprises the following steps/operations. At least two quality-of-service classes are established. Requests are then satisfied so that a client belonging to one quality-of-service class is served with a data version having one overhead associated therewith, while a client belonging to another quality-of-service class is served with a data version having another overhead associated therewith.

Thus, the present invention may advantageously provide efficient load balancing to back-end servers, as well as quality-of-service routing to provide some clients with better quality-of-service than others. Load balancing may follow policies that can be dynamically modified (reconfigured) without having to recompile the application or the intermediary code.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

The present invention will be explained below in the context of an illustrative Internet or web implementation. However, it is to be understood that the present invention is not limited to such an information network architecture. Rather, the invention is more generally applicable to any environment in which it would be desirable to perform efficient and effective load balancing and QoS routing.

For convenience of reference, the remainder of the detailed description will be divided into the following sections: (1) Illustrative Architecture Overview; and (2) Illustrative Methodologies/Systems.

1. Illustrative Architecture Overview

Figure 1:
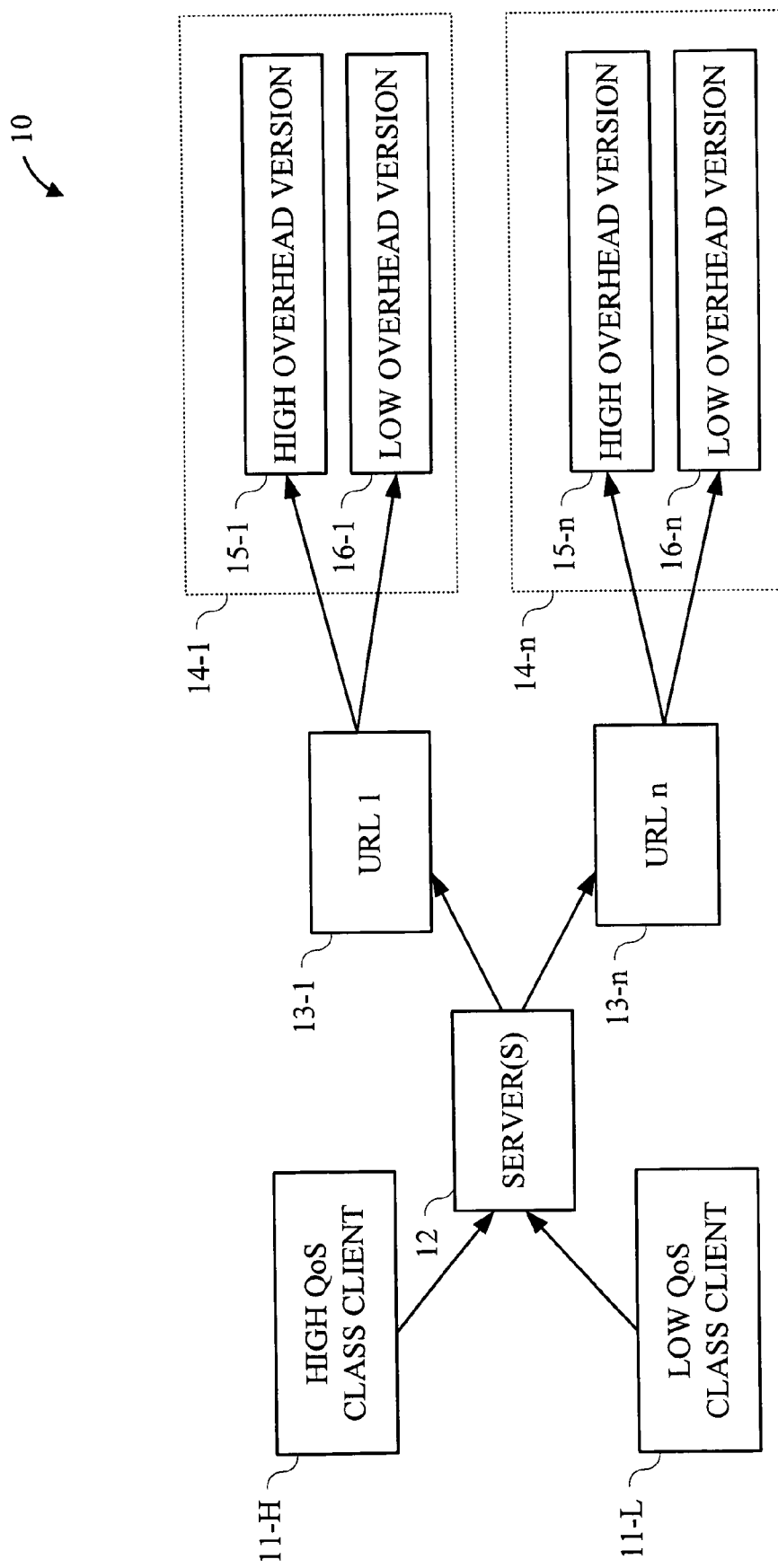
FIG. 1 is a block diagram illustrating an information system implementing techniques of the present invention.

Referring initially to FIG. 1, a block diagram illustrates an information system implementing techniques of the present invention. As shown, information system 10 comprises one or more clients 11-H belonging to a high quality of service class, one or more clients 11-L belonging to a low quality of service class, one or more web servers 12, and content sources 14-1 through 14-$n$ accessible via uniform resource locators (URLs) 13-1 through 13-$n$. It is to be appreciated that the content sources may be but are not limited to back-end databases and/or other back end-systems such as messaging/transaction systems, server programs for creating data on-the-fly, etc. It is to be further appreciated that the components in system 10 may be part of a larger distributed information system such as the Internet or World Wide Web.

It is possible to have more quality of service classes (e.g., 3, 4, 5, 6, etc.) as well. Clients belonging to higher quality of service classes are given preferential access to higher quality content. In many cases, higher quality content requires more overhead to serve. Examples of higher quality content include but are not limited to more detailed content, more current content, higher resolution images, etc. The system depicts each content source as including content in a high overhead version (15-1 through 15-$n$) and a low overhead version (16-1 through 16-$n$). The high overhead version is typically of higher quality than the low overhead version. Note that there may be more than two content versions (e.g., 3, 4, 5, 6, etc.).

Different versions may typically require different overheads to serve. The overhead to serve a version is typically correlated with the quality of the version.

The web clients may be satisfied either by high quality content or by lower quality content. The high quality content usually consumes more overhead to generate. In order to meet a wide range of requirements for service satisfaction, the web pages may, be differentiated into versions with different levels of overheads. Such a method can also be adapted to configure web servers with heterogeneous capacity to serve clients with differentiated services. As illustrated in FIG. 1, the web pages have multiple versions, which are usually generated with different overheads.

In data-driven web sites, the contents may be retrieved from back-end information systems such as database servers and mainframes. In such a context, content differentiation is realized through differentiated content replication and query routing.

Figure 2:
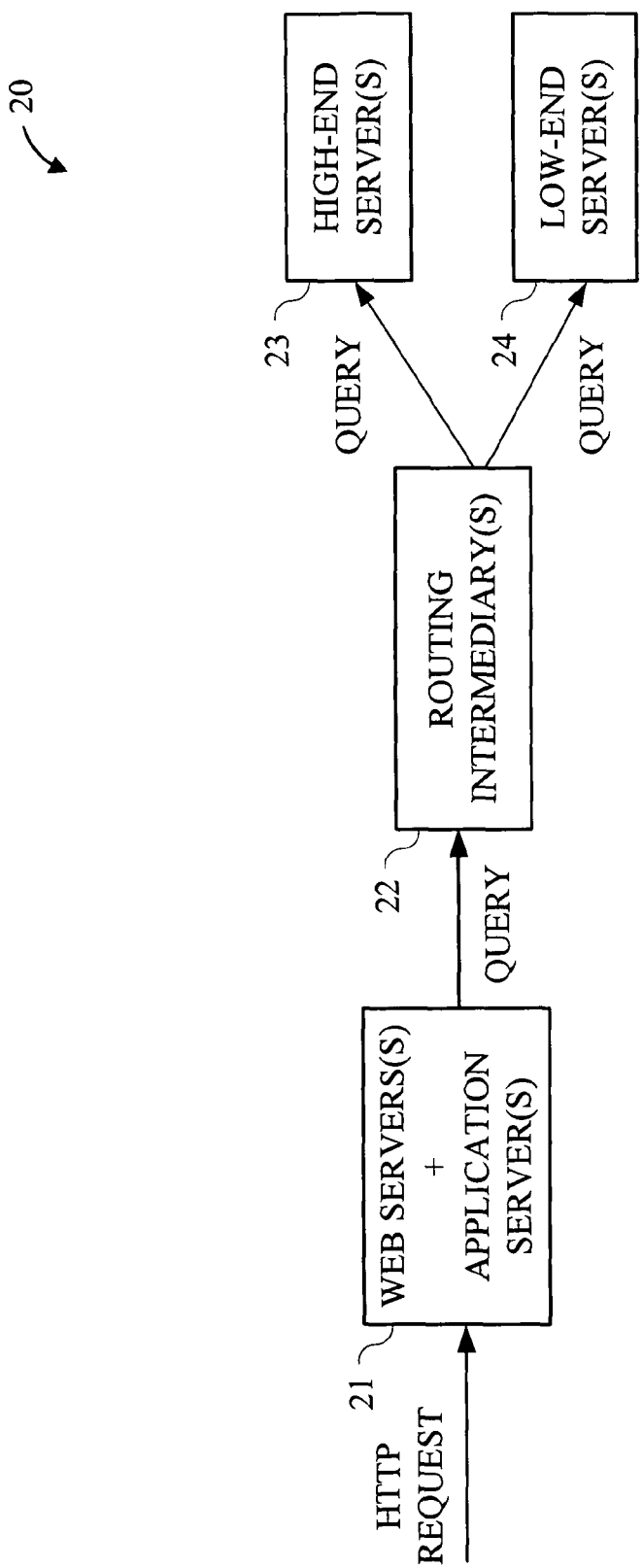
FIG. 2 is a block diagram illustrating an exemplary tiered back-end information system implementing techniques of the present invention.

FIG. 2 is a block diagram illustrating an exemplary tiered back-end information system implementing techniques of the present invention. As shown, system 20 comprises one or more (front end) web servers and one or more application servers 21, one or more intelligent routing intermediaries 22, and tiered back-end servers 23 and 24. These back-end servers may be database servers. Also, there may be multiple high-end servers 23 and/or multiple low-end servers 24.

The high-end server 23 stores the most updated information with the highest level of quality. The response time could be adversely affected if the high-end server is overwhelmed with too many client requests. Therefore, the high-end server 23 may only satisfy a fraction of the requests during periods of heavy loads.

The low-end server 24 periodically replicates content from the high-end server 23. Low-end server 24 contains less frequently updated or lower fidelity information. Low-end server 24 starts serving requests when the traffic is beyond the capacity of high-end server 23, requests are from less-favored clients, and/or the contents in low-end server 24 are sufficient for satisfying the requirements (such as image resolution, document size, etc.) of the clients.

Low-end server 24 could be different from high-end server 23 to reduce the cost associated with different query types. For instance, the high-end server 23 could run DB2 (available from IBM Corporation of Armonk, N.Y.) and the low-end server 24 could run MySQL (available from MySQL Inc. of Seattle, Wash.). The low-end server may serve selected queries to exploit MySQL's limitations in this type of operation. DB2 DataPropogator/DataJoiner could be used to propagate the data to MySQL. It is important to resolve the incompatibility that may arise between the two systems.

2. Illustrative Methodologies/Systems 2.1 QoS Approaches

The overhead of serving a version of content is usually correlated with its quality. A high quality version usually consumes more resources. Based on data quality and system configuration, there are multiple ways to realize the QoS approach of the invention such as: quality differentiation, data partition, and query type differentiation.

In the quality differentiation approach, the back-end servers store contents with different overheads. The high-end server 23 stores the high quality contents, while the lower-end server 24 contains data with lower overheads. It is to be understood that there may be more than two servers storing more than two different levels of quality. The low-end server performance in processing the low overhead data can match or even exceed that of the high-end server. In the data partition approach, the data in all of the back-end servers may have the same overhead, but some back-end servers do not fully replicate the whole data set. In the third approach, back-end servers are optimized in different ways to serve specific query types.

In quality differentiation, the client can be served with higher quality content at a cost of more overhead. High quality content may consume more central processing unit (CPU) time. High resolution images consume more network bandwidth. The most current time sensitive content is often not cacheable and thus requires more overhead to retrieve.

The quality differentiation approach may be applicable in the following types of environments:

(i) The high-end servers store more detailed documents and high resolution images and the low-end servers store the stripped down versions. Requests are routed to the high-end servers when the traffic is light. Under heavy load, premium clients are still routed to the high-end servers, while the others are served by the low-end servers. Client profiling can be based on their subscription (e.g., high paying customers enjoy better quality of data than low paying ones) or on client characteristics such as the capacity of their devices. For instance, those who use handheld devices may be served with low-resolution images that match the rendering capability of the devices.

(ii) In a streaming query service, the contents are frequently updated, and the freshness of the data determines the quality of service. The high-end servers store the most updated data, and the low-end servers periodically replicate content from the high-end servers. When the traffic is high, the low paying customers are served with contents from low-end servers to prevent the high-end servers from becoming overloaded.

Although high quality content is desired in many situations, there are cases where low response latency is preferred. Clients using low bandwidth links like wireless and dial-up networks may prefer the responsiveness of the server over the quality of content. Therefore, the clients have different requirements for the services. QoS can thus be provisioned through differentiating the quality of contents and varying the response latency.

In the data partition approach, data sets are split and assigned to different back-end servers. For instance, in an electronic commerce (e-commerce) web site, one back-end server may store the inventory data while another may store the customer information. Queries that operate on different data sources are routed to the appropriate back-end servers. This approach enables efficient data caching, retrieval, and benefits disk and memory-intensive operations. However, its effectiveness may be contingent on the data dependency. If the operations frequently use both inventory and customer data simultaneously, then multiple connections may be needed to retrieve the data from different back-end servers.

Applications using query type differentiation may be as follows. The back-end servers are of different system types, some of which perform better on particular operations than others. The routing module exploits this difference to gain in both performance and cost. For instance, simple database implementations like MySQL excel in query types such as select. Hence some back-end servers can be customized to serve these type of queries. It is also beneficial to tailor the hardware configuration to expedite the execution of specific operations. For instance, more random access memory (RAM) can substantially expedite join operations. More powerful CPUs can accelerate the execution of computationally intensive queries. This approach may take into account the data layout to improve data locality.

2.2 Load-Based Quality Differentiation

Figure 3:
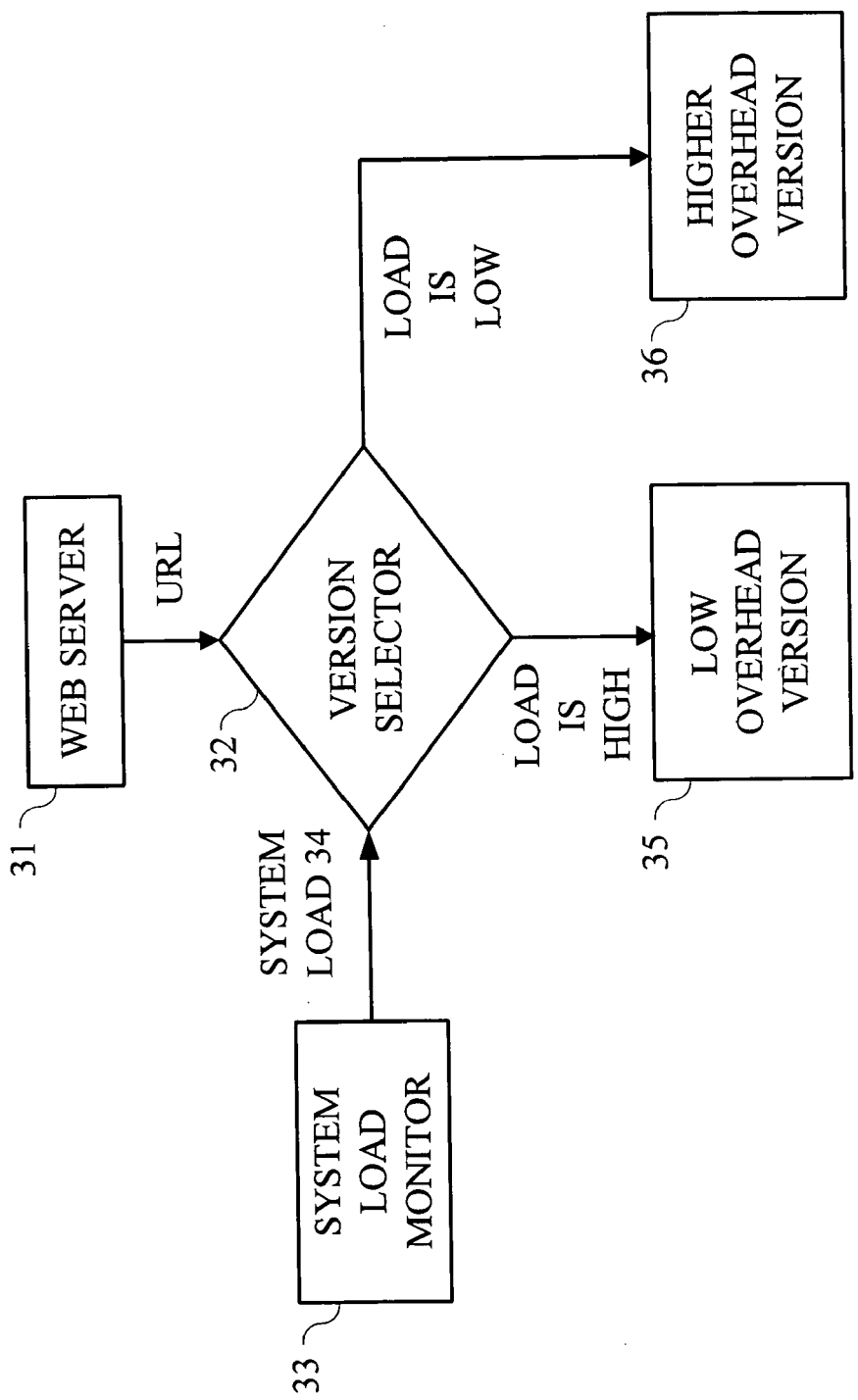
FIG. 3 is a block diagram illustrating a load-based quality differentiation methodology according to an embodiment of the present invention.

FIG. 3 is a block diagram illustrating a load-based quality differentiation methodology according to an embodiment of the invention. The methodology illustrated may be implemented by one or more back-end servers. In the load-based quality differentiation approach of FIG. 3, multiple clients are treated in the same way. The version of contents that the requests are serviced with is determined by the system load. The system load may be a function of the CPU usage and traffic intensity to the storage devices.

For instance, a sample policy can be the following: (i) when CPU usage is under 80%, all the requests are serviced with high quality; (ii) when CPU usage is above 90%, all the requests are serviced with low quality; and (iii) when CPU usage is between 80% and 90%, 50% of the requests go to high quality and 50% go to low quality.

In this approach, a version selector 32 receives the URL from the web server 31. If the URL has multiple versions with different overheads, the system load monitor 33 is consulted. System load monitor 33 monitors the load of the web server, the network, and the back-end systems. The monitor sends load information 34 to the version selector 32. The load information 34 can be in forms such as CPU usage, disk traffic, etc. The version selector 32 selects the appropriate version (e.g., low overhead version 35 or high overhead version 36) of the URL based on the load information and policies, retrieves the content and communicates with the web server 31.

2.3 Class-Based Quality Differentiation

Figure 4:
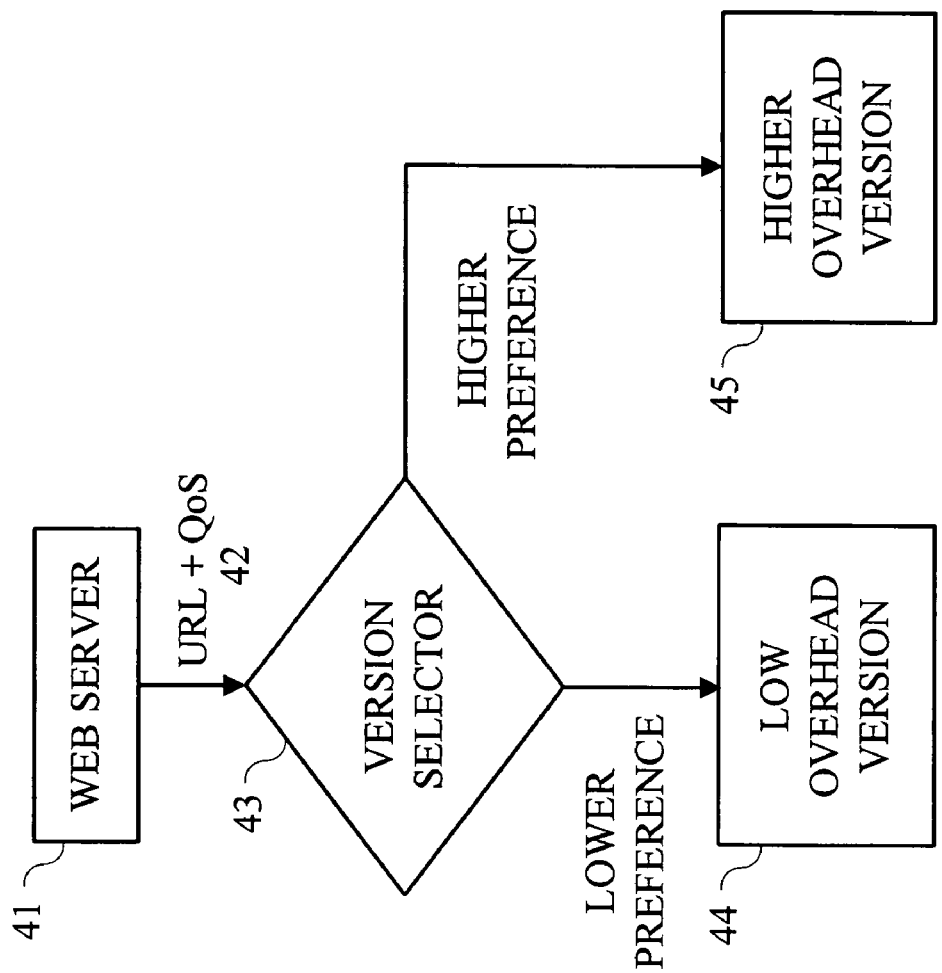
FIG. 4 is a block diagram illustrating a class-based quality differentiation methodology according to an embodiment of the present invention.

FIG. 4 is a block diagram illustrating a class-based quality differentiation methodology according to an embodiment of the invention. The methodology illustrated may be implemented by one or more back-end servers. As depicted in FIG. 4, the version for the requested URL is determined by the QoS class to which the client belongs. The QoS class of the client is identified by the Internet Protocol (IP) address from where the request originates and/or other client information such as a login name, cookie, etc.

Requests in the higher preferential class are serviced with the contents with higher quality. For instance, a class-based routing policy can be as follows: (i) class 1: 100% to high quality; (ii) class 2: 35% to high quality, 20% to medium quality, 45% to low quality; and (iii) class 3: 50% to medium quality, 50% to low quality.

In this approach, the web server 41 parses the HyperText Transport Protocol (HTTP) requests, extracts the identity of the client, and the browser characteristics. Such information 42 is passed to the version selector 43. The version selector 43 selects the appropriate version (e.g., low overhead version 44 or high overhead version 45) of the URL based on the QoS information and policies, retrieves the content, and communicates with the web server 41.

2.4 Hybrid quality differentiation

Figure 5:
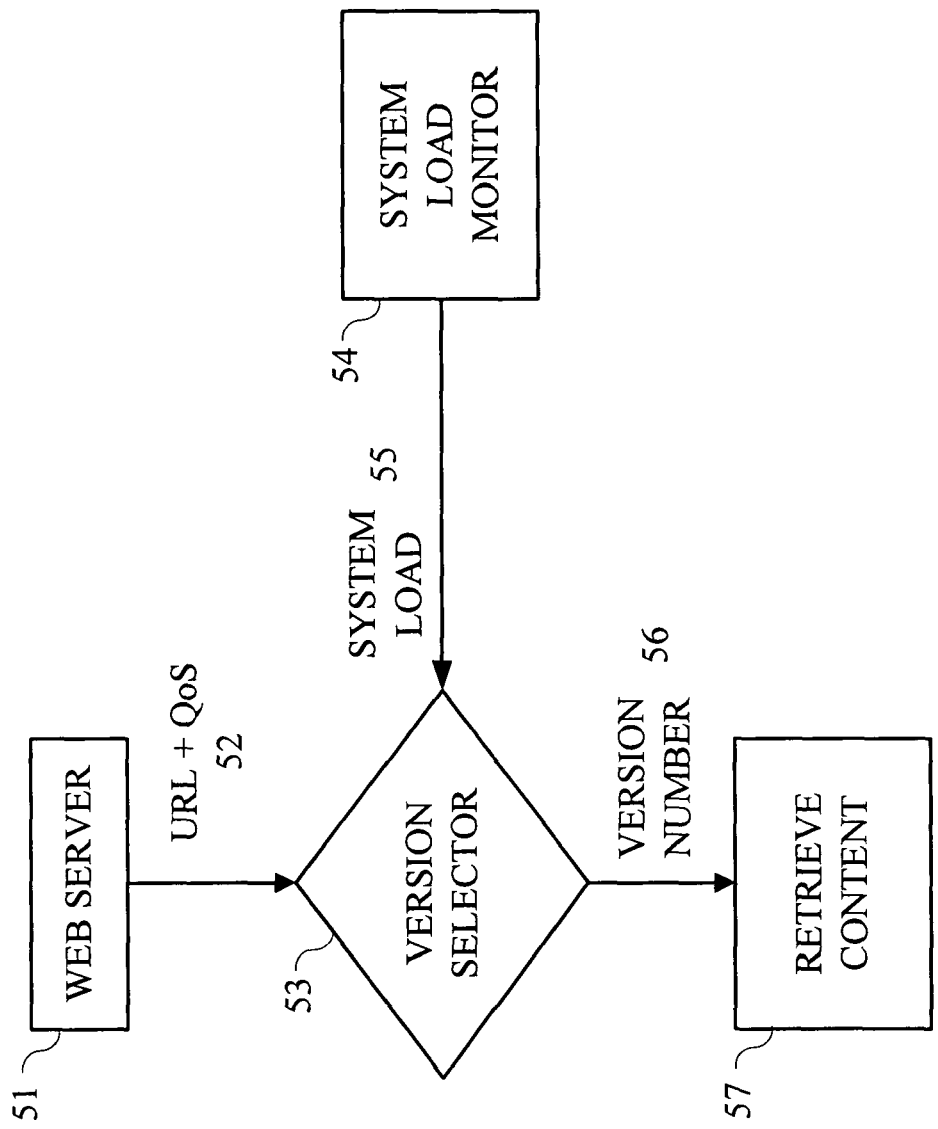
FIG. 5 is a block diagram illustrating a hybrid quality differentiation methodology according to an embodiment of the present invention.

FIG. 5 is a block diagram illustrating a hybrid quality differentiation methodology according to an embodiment of the invention. The methodology illustrated may be implemented by one or more back-end servers. In FIG. 5, the version used to service the request is jointly determined by the QoS class of the client and the current system load. For instance, a policy can be as follows: (a) when the CPU usage is under 80%, all the requests are serviced with high quality; and (b) when CPU usage is above 80% then: (i) class 1: 80% requests in class go to high quality, 20% go to low quality; (ii) class 2: 35% to high quality, 20% to medium quality, 45% to low quality; and (iii) class 3: 50% to medium quality, 50% to low quality.

In this approach, the version selector 53 receives the URL and QoS class 52 of the client from the web server 51. If the URL has multiple versions with different overheads, the system load monitor 54 is consulted. System load monitor 54 monitors the load of the web server, the network, and the back-end systems. Monitor 54 sends load information 55 to the version selector 53. The version selector 53 selects the appropriate version (e.g., version number 56) of the URL based on the load information, QoS class of the client, and policies, retrieves (57) the content, and communicates with the web server 51.

2.5 Tiered Configuration

In a multi-tier environment as illustrated in FIG. 2, the contents may be retrieved through back-end servers 23 and 24. The requests are routed to the appropriate servers to get the proper service. The routing intermediary 22 carries out the routing functionality. The tiered back-end servers can be of heterogeneous capacity. For instance, in the database environment, the data tables may not be fully replicated among all the back-end servers. The one with the fullest replication would then be the high-end server 23, and those with partial replication are low-end servers 24. The high-end servers 23 usually have more capacity than the low-end servers 24.

When the HTTP request arrives, the front-end web server 21 parses the request and extracts the client identity, if available. The client identity correlates with the QoS level at which the request will be served. The web server 21 may invoke business application logic in the application server (such as an IBM Corporation WebSphere application server). These business applications do not have to be aware of the back-end server configuration. Thus, rewriting of these applications may not be necessary.

When the business applications communicate with the back-end service, they first pass the queries to the routing intermediary 22. The latter routes the queries to the appropriate back-end server based on the QoS classes to which the queries belong, the load distribution of the back-end servers, and the type of the queries (e.g., whether they update the data source). The following sections describe illustrative routing policies and implementations.

2.6 Routing Policies

The routing intermediary 22 routes queries to the back-end servers under specific routing policies. Instances of routing policies in this configuration may include:

(1) Data affinity. If the application needs to access database tables that do not reside in the low-end server 24, the application uses the high-end server 23. This policy applies to situations where data is not fully replicated.

(2) Data consistency. If the application is known to include data insert, update, or deletion operations, a virtual driver (described below in the context of FIG. 9) selects the high-end server 23 as its data source to keep the low-end server 24 updated. The routing intermediary 22 can also be programmed to schedule such queries to update the low-end server 24 upon completion of the application.

(3) Query complexity. If the application contains queries that are not well handled in one server such that the processing of these queries would incur significant latency as compared to the other server, this application will use the high-end server 23. Examples of these operations include join and recursive select. Detection of this situation may not require analyzing the application code. It may be identifiable by comparing the previous access time from the two servers.

(4) QoS policy. In the QoS-based policy, the server selection is a function of the traffic composition and the priority of the request. Such a policy is further explained below in section 2.11.

(5) Server load. In the load balancing policy, if the high-end server 23 is projected to be highly loaded, the following requests use the low-end server 24. Such a policy is further explained below in section 2.10.

2.7 Back-End Server Selection

In a multi-node back-end server configuration, the contents with different versions may be replicated across the back-end servers. The back-end servers that contain the high quality versions of contents usually consume more resources to serve the requests. For instance, one server may be a database server that receives external update process frequently. It keeps its data most updated. The other server may be a file server that caches the query results from the database server. The database server may take substantially more CPU time to process a query than the file server. However, the database produces the more current version.

Figure 6:
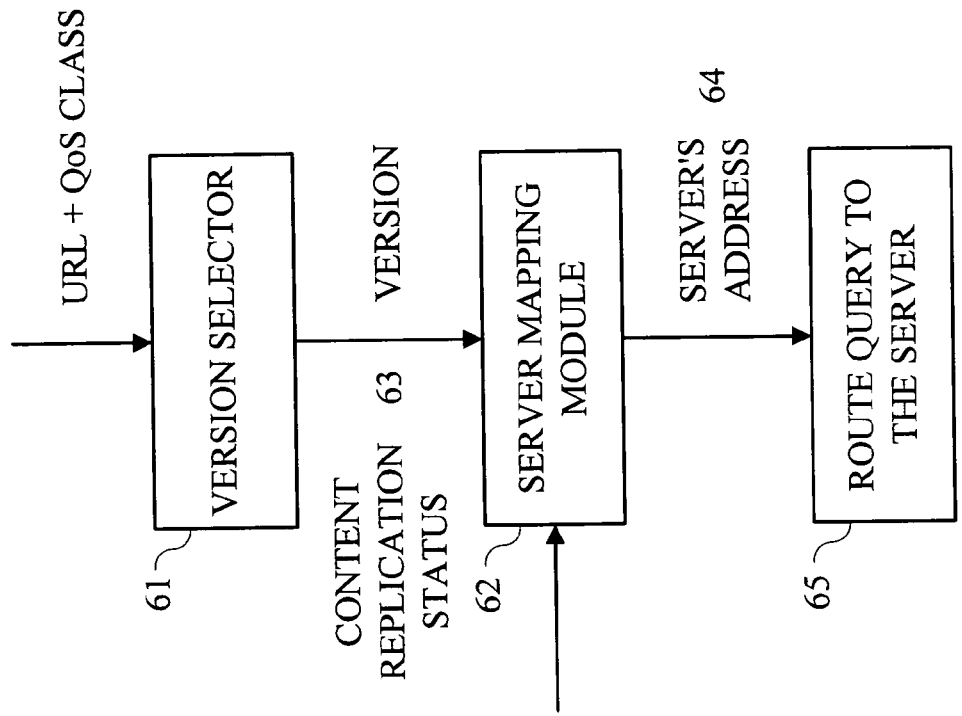
FIG. 6 is a block diagram illustrating a back-end server selection methodology according to an embodiment of the present invention.

FIG. 6 is a block diagram illustrating a back-end server selection methodology according to an embodiment of the invention. As depicted in FIG. 6, the URL and the QoS information is passed to the version selector 61, which decides which version of the URL should serve the request. The version selector 61 then passes the version number to a server mapping module 62. The server mapping module 62 maintains content replication information 63 that maps where the contents and their multiple versions are replicated throughout the back-end servers. The server mapping module 62 extracts the server address 64 based on the version number and the replication status. Module 62 then connects to the address 64 and routes the queries thereto. This functionality may be implemented in the routing intermediary 22.

2.8 System Implementation Alternatives

The present invention provides for different implementation alternatives, including a centralized mode and a distributed mode.

In centralized mode, the routing decision is made by a centralized routing intermediary which may have knowledge about the traffic, system load, and/or configuration differences between the back end servers. Web applications communicate with the routing intermediary to get routing instructions.

In distributed mode, the routing decision is not made by a centralized entity. Web applications route queries to the appropriate back end servers based on a local estimation of the load distribution in the back end servers. The web applications periodically converge their individual routing policies and revise them if necessary to keep the policies consistent.

2.8.1 Centralized Mode

Figure 7:
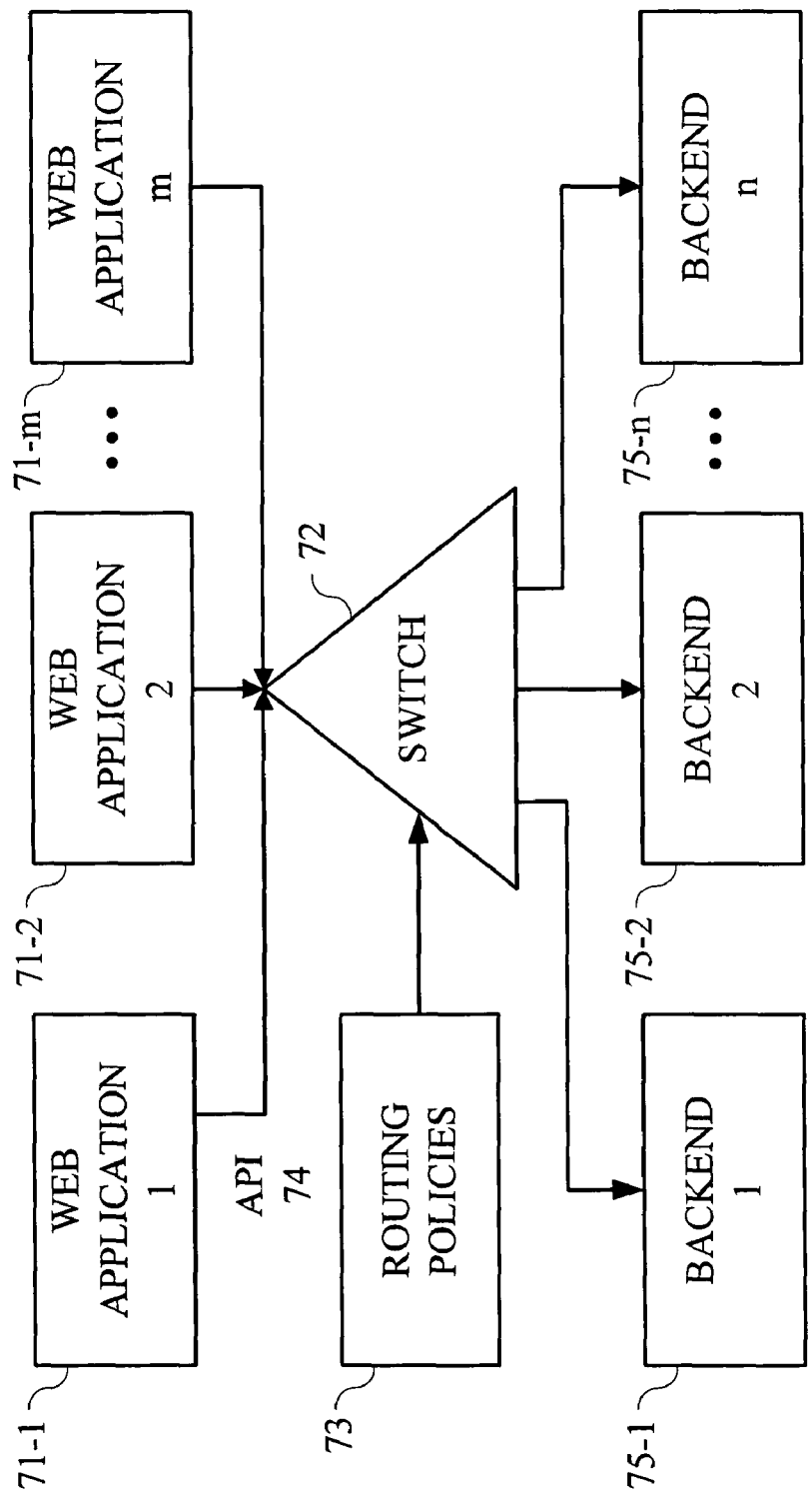
FIG. 7 is a block diagram illustrating a centralized load balancing mode according to an embodiment of the present invention.

FIG. 7 is a block diagram illustrating a centralized load balancing mode according to an embodiment of the present invention. As shown, web applications 71-1 through 71-m communicate with a switch 72. The switch 72 uses routing policies 73 to handle server selection, query transmission, and result relay to the web applications. Switch 72 may be implemented as the above-described routing intermediary module 22 (FIG. 2). The routing policies 73 are illustratively described above in section 2.6.

One advantage is that the routing intermediary has a global view of the traffic to back-end servers 75-1 through 75-n. Switch 72 can thus ensure that routing decisions are consistent. However, switch 72 may become a bottleneck when traffic is heavy. Such implementation also may require special application programming interfaces (APIs) 74 for multiple web applications that reside in different machines, so as to communicate with switch 72 that interacts with back-end servers 75-1 through 75-n. Thus, this mode may require changes to existing applications.

2.8.2 Distributed Mode

Figure 8:
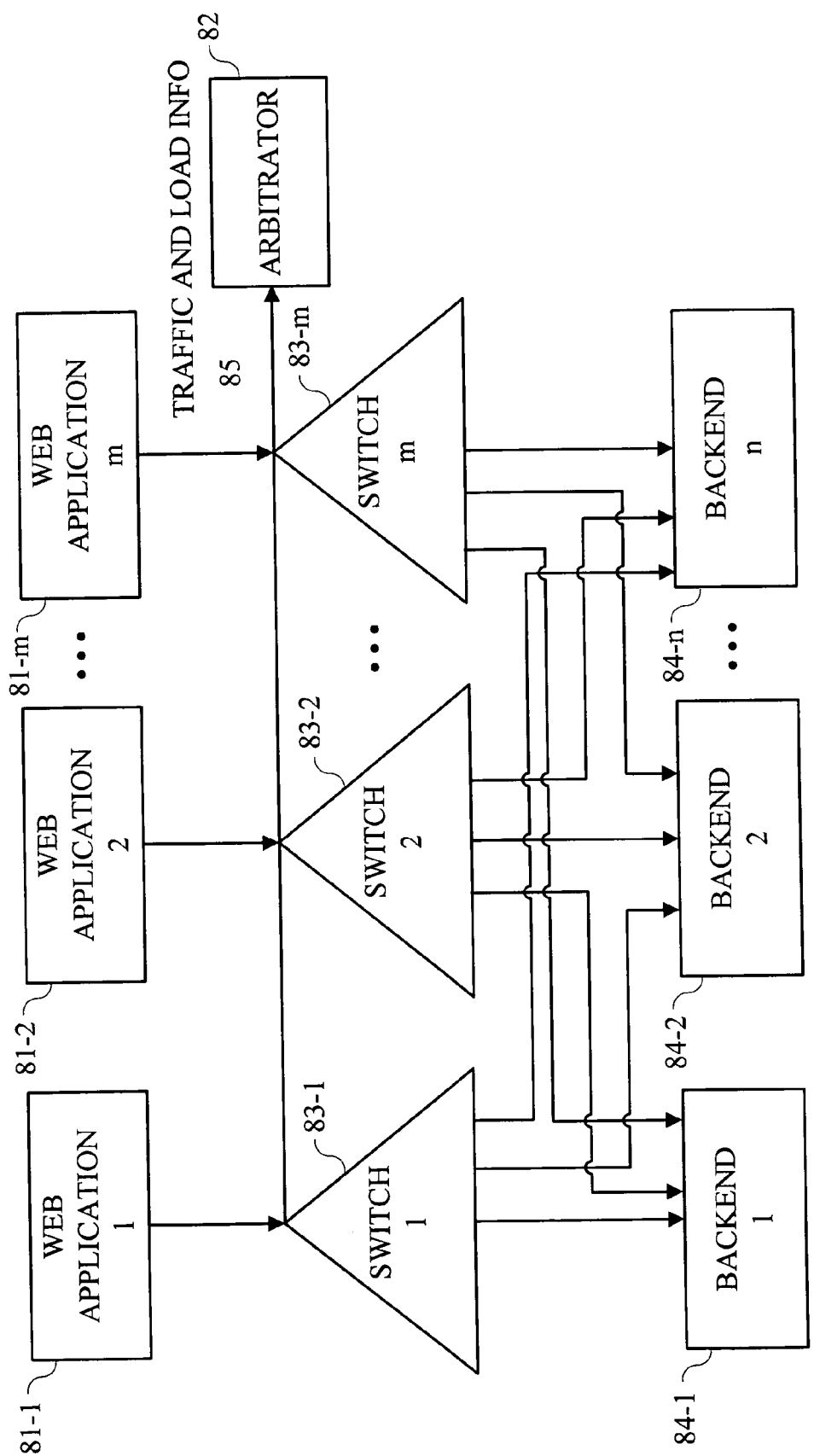
FIG. 8 is a block diagram illustrating a distributed load balancing mode according to an embodiment of the present invention.

FIG. 8 is a block diagram illustrating a distributed load balancing mode according to an embodiment of the present invention. In this mode, the web applications 81-1 through 81-m make their own routing decisions (regarding back-end servers 84-1 through 84-n) locally using corresponding switches 83-1 through 83-m, and periodically communicate with an arbitrator 82. Arbitrator 82 merges global routing and traffic information 85 and instructs the web applications to adjust their routing strategies. This mode distributes the routing functionality and is thus more scalable than the centralized mode. Arbitrator 81 may use the load detection method and QoS policy coordination method described below in section 2.10 and section 2.11, respectively.

2.9 Routing Intermediary Implementation

Figure 9:
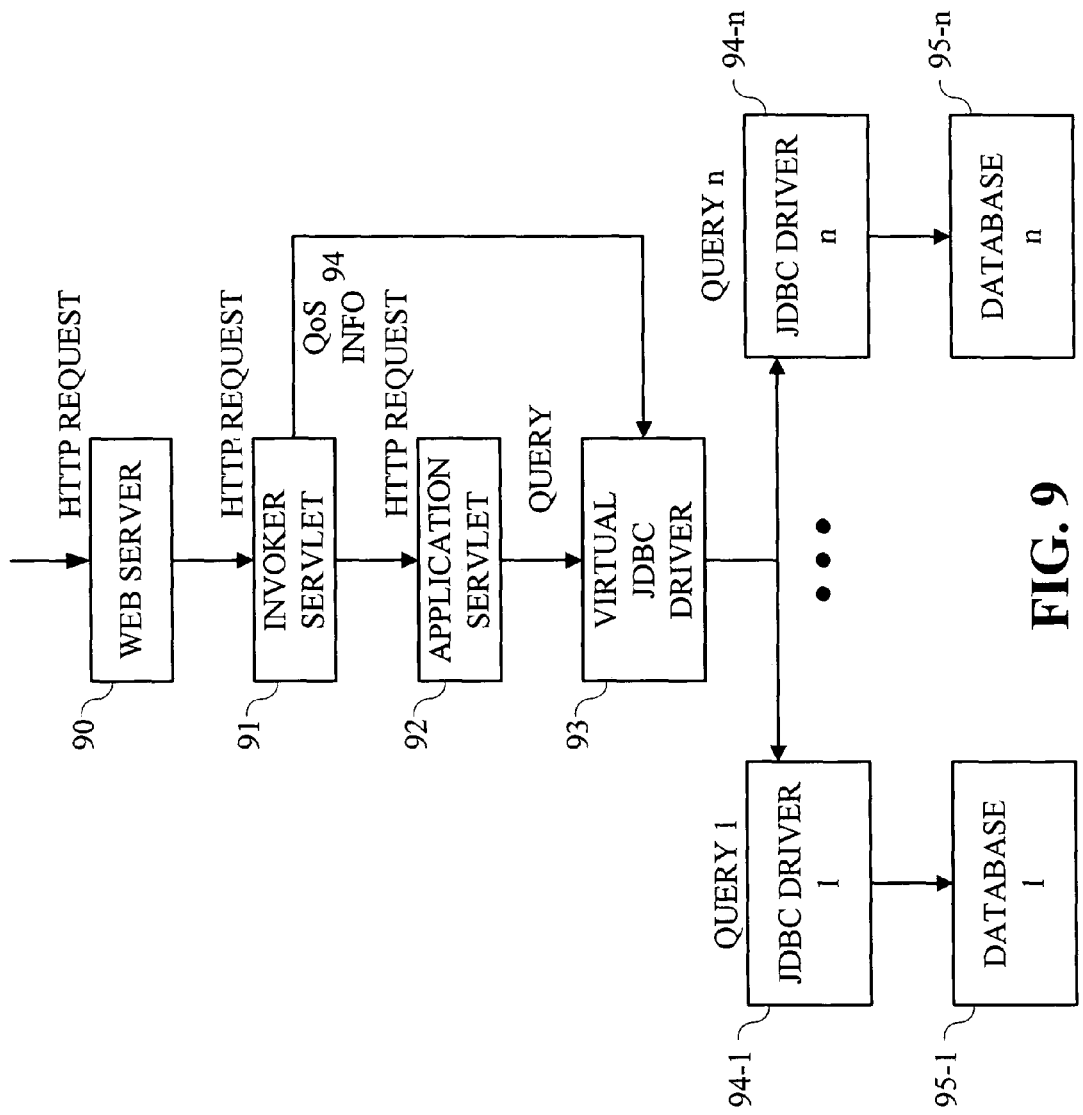
FIG. 9 is a block diagram illustrating a routing intermediary according to an embodiment of the present invention.

FIG. 9 is a block diagram illustrating a routing intermediary according to an embodiment of the present invention. In this embodiment, the routing intermediary is implemented in accordance with a Java servlet-based system. It is to be assumed that database servers provide back-end service.

As illustrated in FIG. 9, there are two components in the routing intermediary: an invoker servlet 91 and a virtual JDBC driver 93. The invoker servlet 91 can communicate with the virtual JDBC driver 93 through message passing or shared memory.

In the Java servlet context, an invoker servlet (91) may refer to the server that obtains the processing handle of the HTTP requests after the web server (90) finishes the protocol processing. The invoker servlet may resolve the mapping between URLs and actual business application logic and construct the run time environment for the business application logic. Application servlet 92 may be invoked by invoker servlet 91, and implements the business logic.

JDBC drivers 94-1 through 94-n may be the interfaces between applications (such as Java servlets) and database servers 95-1 through 95-n. A JDBC driver receives commands (Structured Query Language commands or SQLs) from the applications, translates them according to the specific protocols, sends the commands to the database server, and retrieves results from the database server.

Virtual JDBC driver 93 resides between the applications and the actual JDBC drivers 94-1 through 94-n that communicate with the database servers 95-1 through 95-n. Driver 93 receives the commands from the applications and relays them to the actual JDBC drivers. During the relay, driver 93 may adapt the commands according to the specification of the destination driver. Driver 93 is also able to choose where the commands will be routed.

Invoker servlet 91 obtains the client information from the HTTP requests. Such information may include the identity of the client that determines its priority and its browser type that indicates the rendering capability. Invoker servlet 91 then passes this information 94 to virtual JDBC driver 93 before sending the requests to the application servlet 92 that carries out the business logic. When the application servlet 92 needs to contact the database, it may first set up a database connection.

One exemplary method for setting up a database connection is to invoke a function such as the following:

Connection conn=DriverManager·getConnection (url, "username", "password")

where url is a string that points to the address of the database server.

Instead of directly connecting to the actual database server, the application servlet 92 may call virtual JDBC driver 93 first by assigning its address to the parameter url. Then, subsequent commands may be intercepted by virtual JDBC driver 93.

Virtual JDBC driver 93 handles query routing and resolution of query syntactical differences. More specifically, when virtual JDBC driver 93 is called, the driver decides which actual database server should serve the consequent queries from the application servlet. Such methods are described herein in sections 2.6, 2.7, 2.10 and 2.11.

There are many platform-dependent SQL schemas in different database servers. Therefore, it may be necessary to provide appropriate SQLs to heterogeneous databases. There are multiple solutions, such as: deferred query materialization and query rewriting.

Deferred query materialization provides an abstract layer for query languages. Instead of directly using SQL queries, the application logic uses special APIs that are independent of the back-end database implementations to construct the query logic and then translate it into real platform-dependent database queries. Consequently, the application logic often need not be aware of the actual database that it interacts with, and the programmers can be more focused on the business logic itself. Examples of this kind include Java Data Object (JDO) specifications (Sun Microsystems of Santa Clara, Calif.). A drawback of this method is that existing applications may have to be rewritten to adopt the tiered services. Alternatively, a query can also be rewritten before being directed to the tiered servers to resolve the syntactical differences; thus, the overhead of modifying existing applications is amortized.

After selecting the actual database server and resolving the query syntactical differences, virtual JDBC driver 93 calls the actual JDBC driver that is associated with the database server and passes the query to that actual JIDBC driver. The latter carries out the database processing logic.

2.10 Load Detection

One way to detect server load is to use response time variation. However, because the access time of a single database query can vary significantly, it may not always be a reliable indicator of server load.

Load detection techniques may be based on the variation of the ratio of the total database access time per URL and the associated HTTP request processing time. The database access time may be determined by the size of the result set, the query complexity, and the degree of query concurrency, which is highly volatile. However, the corresponding servlet might need to process the result set and construct the query command, the complexity of which is approximately linear with that in accessing the database server. Thus, when the data set does not vary significantly, the ratio can signify which server is overloaded. A higher ratio that results from long database access times suggests that the database is more loaded. Conversely, a lower ratio suggests that the web server is less loaded.

More specifically, the database server selection algorithm for those URLs that have no data update operations may be as follows. If the previous accesses reveal that a URL is database intensive (characterized by the total database access time), then upon completion, the ratio of its total database access time and the HTTP processing time may be evaluated and compared to the previous values. If their difference is beyond a certain threshold, the switch may be instructed to route some traffic to the secondary database server. Otherwise, current traffic load may be considered acceptable for the high-end server (23 of FIG. 2) capacity, and the current traffic rate and the ratio value may be recorded for future reference.

The load detection algorithm may determine the maximum number of simultaneous requests Max that use the high-end server 23. The quantity Max may be defined as follows:

$$\text{Max} = \begin{cases} a*\text{Max}' + b*\text{Rate}, & r > (1+\Delta)*\tilde{r} \\ \text{Max}' + 1, & \text{otherwise} \end{cases}.$$

In the above equation:
(i) Positive real numbers a and b are tuning parameters and a+b=1. A higher value of a leads to a more gradual decrease in the traffic to the high-end server 23, while a lower value is more effective in preventing the high-end server 23 from being overloaded.
(ii) Max' is the previous value of the maximum number of simultaneous requests.
(iii) Rate is the current traffic rate to the high-end server 23.
(iv) r is the ratio of the database access time and the HTTP processing time of the monitored query, and $\tilde{r}$ is its average value.
(v) $\Delta$ is the variation threshold that controls how much variation of r is considered normal. Variation beyond that is regarded as occurrence of overload.

The idea of the equation is as follows. The current maximum degree of simultaneous connections is determined by its historical values and current traffic rate. The tuning parameters a and b determine how much each component affects the value of Max; larger a and smaller b make Max less subject to traffic variations and vice versa. If the ratio r is within the variation scope, the high-end server 23 may be considered to be underutilized such that additional traffic can be handled without penalty. Once r is beyond its variation scope, the current traffic rate and the historical value of Max approximate the capacity of the high-end server 23. One advantage of this methodology is that there is little modification to current applications and it is adaptable for various servlet applications.

One illustrative embodiment of the algorithm is formulated in the exemplary code below (FACILITIES). Variations within the spirit and scope of the invention by one skilled in the art are also possible.

```
FACILITIES:
boolean contain_update(url): boolean function that tells whether
the given url contains insert/delete/update queries.
long db_processing_time(url, db): function that returns the
processing time (ms) of the given url at the database db.
float ratio(url): function that return the URL's ratio of database
access time to the HTTP processing time.
R: current traffic rate to the primary server.
delta: threshold of ratio variation.
Max: maximum concurrent connections to the primary server.
Conn DB_select(url)
{
if (contain_update(url))
    return primary; /* update queries are routed to the primary server*/
if (R>Max)
    return secondary; /* if the traffic to the primary server is high,
    the secondary starts to function */
if (db_processing_time (url, primary) > db_processing_time
(url, secondary))
    return secondary; /* the url is served by the server that can best
    handle the queries */
}
Postprocessing(url)
{
compute and store the average database access time of the URL at the
selected database d b.
compute the ratio of the database access time to the HTTP processing
time, denoted as r. if the URL is served by the secondary database,
then exit.
if (r > ratio(url)*(1+delta))
    Max = a*Max+b*R;
else
    Max ++;
}
Helper modules:
    boolean contain_update( )....
    long db_processing_time( )....
    float ratio( ).....
    R:....
    Delta:...
    Max:...
Functions:
Conn DB_select( )....
Postprocessing( )....
```

The function DB_select is invoked when the servlet establishes a connection to access the database. The function returns a database connection. The function Postprocessing is invoked when the servlet finishes. This function collects runtime statistics and recomputes the global variables that are used to select the database connections. The complexity of the algorithm is linear with the number of URLs that are tracked, and most of the operations are string matching. The routing overhead is relatively low.

2.11 QoS Policy Coordination

The QoS policy coordination process receives the traffic composition and database selection information from web servers and checks if the collective effect of database scheduling is consistent. If necessary, the QoS policy coordination process notifies web servers to change their local decision function parameters.

Multiple factors may be used to route the database queries, including the following: request priority and the traffic composition from different classes. One illustrative embodiment of the algorithm is formulated as follows. Variations within the spirit and scope of the invention by one skilled in the art are also possible.

For a request r that belongs to class i, the boolean variable $S_i$ represents whether r can access the high-end server 23:

$$S_i = 1\left(\frac{\lambda_i * W_i \text{Max}}{\sum_j \lambda_j * W_j} > C_i\right)$$

where:
(i) 1( ) is the boolean function.
(ii) $\lambda_i$ is the number of requests which have arrived since time point t that belong to class L
(iii) $W_i$ is the priority weight.
(iv) Max is the maximum number of simultaneous requests that the high-end server 23 can accept.
(v) $C_i$ is the number of requests in class i that have used the high-end server 23 since t.

It is inferred from the equation that in a clustered web server environment, where a server makes database selections based on its own traffic conditions, the request routing as a whole across the entire web servers may be incorrect. Therefore, an agent may be set up that mediates the distributed selection algorithms to approximate the ideal value.

The usage of high-end server 23 at web server p, denoted as $N^p$, during time frame T is:

$$N^p = \frac{\lambda_i^p * W_i^p * \text{Max}^p}{\sum_j \lambda_j^p * W_j^p},$$

where $\lambda_i^p$ and $\text{Max}^p$ are the local observed values at web server p. $W_i^p$ is the local priority weight value used by this server.

The ideal collective usage of the high-end server 23, denoted as $N^{ideal}$, from all the web servers is:

$$N^{ideal} = \frac{\sum_p \lambda_i^p * W_i * \sum_p \text{Max}^p}{\sum_j (\sum_p \lambda_j^p * W_j)}.$$

In most cases, $W_j + W_j^p$ cannot ensure.

$$N^{ideal} + \sum_p N^p.$$

Thus, the local priority weight vector $W_i^p$ may be adjusted to approximate the ideal case.

2.12 Externalized Program Logic

Another aspect of this invention is to externalize program logic that is used either to classify customers or to select the back end. The externalization can be done by instrumenting the system with one or more points of variability which are points in program code which are calls to an externalized repository for the logic that needs to be executed. The binding is dynamic, and the logic can be changed over time without recompiling the system code. Technology such as "BRBeans" (IBM Corporation of Armonk, N.Y.) can be used to that effect, see, e.g., A. Nartovich et al., "WebSphere Application Server Enterprise, A Programmer's Guide," Edition 4.0, Chapter 3, IBM Redbooks, February 2002, the disclosure of which is incorporated by reference herein.

The logic that is externalized can be further specified as a set of rules which can be authored by nonexperts in information technology, see, e.g., I. Rouvellou et al., "Extending Business Objects with Business Rules," Proceedings of the 33rd International Conference on Technology of Object-Oriented Languages and Systems, Mont Saint-Michel/St-Malo, France, IEEE Computer Society Press, pp. 238-249, June 2000, the disclosure of which is incorporated by reference herein.

2.13 Service Provider

A further aspect of this invention is how classes are determined for clients and how differentiated content is created. These functions can be performed by a service provider. The service provider assigns clients to different quality of service classes preferably based on how much they are willing to pay for better services. Higher paying clients are assigned to higher quality of service classes.

The service provider also has the ability to provide differentiated content. The service provider does so by figuring out what the bottleneck resource is during peak periods. For example, the service provider might determine that the bottleneck resource for a web site providing significant dynamic content via databases is the database. In order to reduce database overhead, the service provider could provide a cache for frequent queries. The cache could be used to create dynamic content with lower overhead. A drawback is that the cache might not have data which is completely up-to-date. High paying customers could be given preferential access to the most current versions.

The service provider can periodically monitor the system in order to determine which parts of the system might become bottlenecks at different times. For example, at some points, the bottleneck may be a database. At other points, the bottleneck may be the network. The service provider constantly modifies the differentiated content and how it is served to different clients in response to changing conditions.

By way of example, the service provider, in accordance with previously established service agreements with clients, may specify a quality-of-service policy. The policy may comprise a plurality of subscriptions, each subscription being specified by content quality and service latency. A limited premium service subscription may be served with high content quality in low service latency. A medium service subscription may be served with a high content quality or a low service latency. An unlimited best-effort service subscription may be served with unspecified content quality and latency.

2.14 Illustrative Computing System

Figure 10:
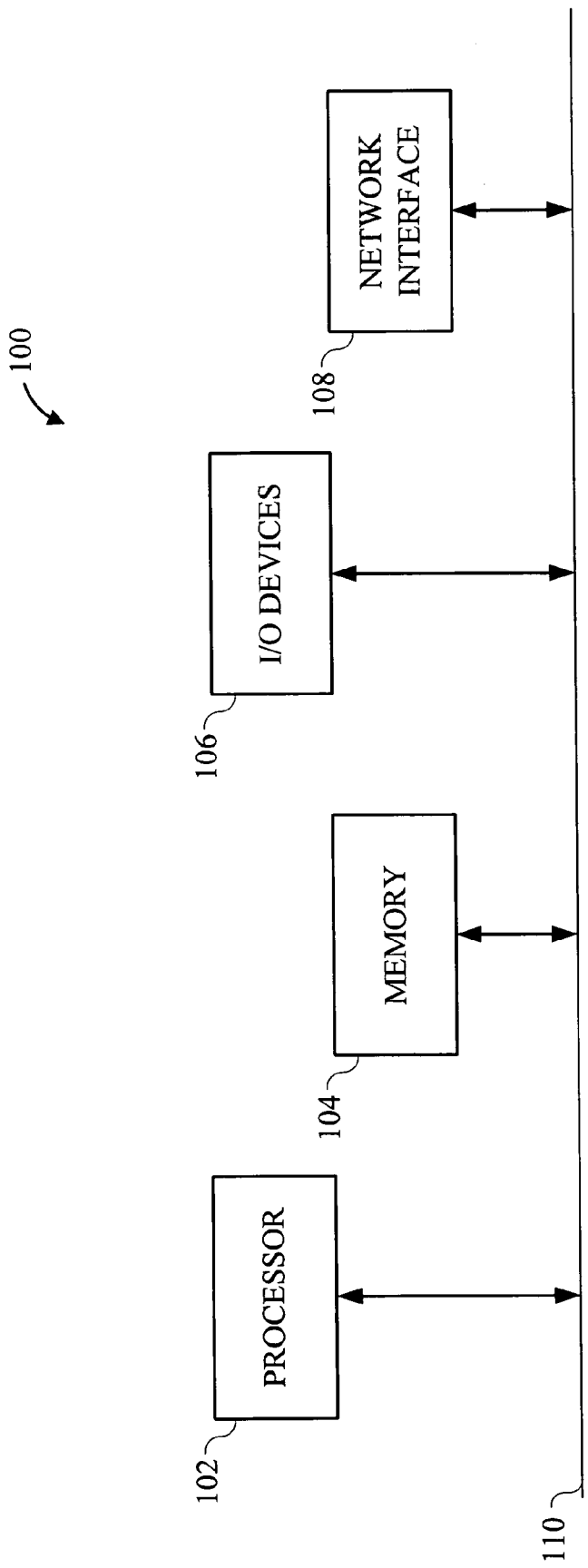
FIG. 10 is a block diagram illustrating an illustrative hardware implementation of a computing system in accordance with which one or more components of an information system may be implemented according to an embodiment of the present invention.

FIG. 10 is a block diagram illustrating an illustrative hardware implementation of a computing system in accordance with which one or more components/steps of an information system (e.g., systems/methodologies described in the context of FIGS. 1 through 9 as may be performed in accordance with the information system) may be implemented, according to an embodiment of the present invention. For example, the illustrative architecture of FIG. 10 may be used in implementing any and all client devices, servers, routing intermediaries, version selectors, server mapping modules, switches, arbitrators, servlets, drivers, etc., as mentioned above.

Further, it is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system 100 may be implemented in accordance with a processor 102, a memory 104, I/O devices 106, and a network interface 108, coupled via a computer bus 110 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of serving data to a plurality of clients in a client-server environment, comprising the steps of:
   generating a plurality of versions of given data in which at least two versions of the given data have different overheads associated therewith, the overhead of a given version of the given data comprising a quantity of processing resources required to serve the given version of the given data;
   assigning individual clients to one of a plurality of quality-of-service classes; and
   satisfying requests so that a client belonging to a high quality-of-service class is given preferential access to data versions which require higher overheads to serve while a client belonging to a low quality-of-service class receives a data version which requires lower overhead to serve;
   wherein the overhead to serve a version is correlated with a quality of the version;
   wherein the plurality of versions comprise images of different resolutions and clients belonging to the high quality-of-service class are given preferential access to higher resolution images while a client belonging to the low quality-of-service class receives a lower resolution image;
   wherein the quality of a version is correlated with a processing time required to create the version; and
   wherein the steps are performed at least in part by at least one processor.

2. The method of claim 1, wherein the overhead to serve a version is correlated with how current the version is.

3. The method of claim 1, further comprising the step of:
   in response to a system load exceeding a threshold, satisfying a higher percentage of requests from clients belonging to a lower quality-of-service class with a version requiring lower overhead to serve.

4. The method of claim 1, wherein the server comprises multiple nodes and different nodes provide data versions requiring different overheads to serve.

5. The method of claim 1, further comprising the step of implementing a quality-of-service policy that specifies at least one of content quality and latency.

6. The method of claim 5, wherein one or more clients belonging to a premium service class are served with high content quality and low latency.

7. The method of claim 5, wherein one or more clients belonging to a medium service class are served with one of high content quality and low latency.

8. The method of claim 5, wherein one or more clients belonging to a best-effort service class are served with unspecified content quality and latency.

9. The method of claim 1, wherein a client request is routed using at least one of an identity of the client, a quality of content, a load on at least one server, a data distribution on at least one server, and a capacity of at least one server.

10. The method of claim 1, wherein a client is assigned to a quality-of-service class by program logic that is externalized from the server.

11. The method of claim 1, further comprising the step of satisfying requests using a policy determined by program logic that is externalized from the server.

12. Apparatus for serving data to a plurality of clients in a client-server environment, comprising:
   a memory, and
   at least one processor coupled to the memory and operative to: (i) generate a plurality of versions of given data in which at least two versions of the given data have different overheads associated therewith, the overhead of a given version of the given data comprising a quantity of processing resources required to serve the given version of the given data; (ii) assign individual clients to one of a plurality of quality-of-service classes; and (iii) satisfy requests so that a client belonging to a high quality-of-service class is given preferential access to data versions which require higher overheads to serve while a client belonging to a low quality-of-service class receives a data version which requires lower overhead to serve;
   wherein the overhead to serve a version is correlated with a quality of the version;
   wherein the plurality of versions comprise images of different resolutions and clients belonging to the high quality-of-service class are given preferential access to higher resolution images while a client belonging to the low quality-of-service class receives a lower resolution image; and
   wherein the quality of a version is correlated with a processing time required to create the version.

13. The apparatus of claim 12, wherein the overhead to serve a version is correlated with how current the version is.

14. The apparatus of claim 12, wherein the at least one processor is further operative to, in response to a system load exceeding a threshold, satisfy a higher percentage of requests from clients belonging to a lower quality-of-service class with a version requiring lower overhead to serve.

15. The apparatus of claim 12, wherein the at least one processor comprises multiple nodes and different nodes provide data versions requiring different overheads to serve.

16. The apparatus of claim 12, wherein the at least one processor is further operative to implement a quality-of-service policy that specifies at least one of content quality and latency.

17. The apparatus of claim 16, wherein one or more clients belonging to a premium service class are served with high content quality and low latency.

18. The apparatus of claim 16, wherein one or more clients belonging to a medium service class are served with one of high content quality and low latency.

19. The apparatus of claim 16, wherein one or more clients belonging to a best-effort service class are served with unspecified content quality and latency.

20. The apparatus of claim 12, wherein a client request is routed using at least one of an identity of the client, a quality of content, a load on at least one server, a data distribution on at least one server, and a capacity of at least one server.

21. An article of manufacture for use in serving data to a plurality of clients in a client-server environment, comprising a non-transitory machine readable storage medium containing one or more programs which when executed implement the steps of:
  generating a plurality of versions of given data in which at least two versions of the given data have different overheads associated therewith, the overhead of a given version of the given data comprising a quantity of processing resources required to serve the given version of the given data;
  assigning individual clients to one of a plurality of quality-of-service classes; and
  satisfying requests so that a client belonging to a high quality-of-service class is given preferential access to data versions which require higher overheads to serve while a client belonging to a low quality-of-service class receives a data version which requires lower overhead to serve;
  wherein the overhead to serve a version is correlated with a quality of the version;
  wherein the plurality of versions comprise images of different resolutions and clients belonging to the high quality-of-service class are given preferential access to higher resolution images while a client belonging to the low quality-of-service class receives a lower resolution image; and
  wherein the quality of a version is correlated with a processing time required to create the version.

22. A system, comprising:
  a plurality of clients, each client belonging to a quality-of-service class;
  a load balancer for sending requests from clients to at least one back-end server; and
  at least one back-end server for (i) generating a plurality of versions of a given object in which at least two versions of the given object have different overheads associated therewith, the overhead of a given version of the given object comprising a quantity of processing resources required to serve the given version of the given object and (ii) satisfying the requests so that a client belonging to a high quality-of-service class is given preferential access to object versions which require higher overheads to serve while a client belonging to a low quality-of-service class receives an object version which requires lower overhead to serve;
  wherein the overhead to serve a version is correlated with a quality of the version;
  wherein the plurality of versions comprise images of different resolutions and clients belonging to the high quality-of-service class are given preferential access to higher resolution images while a client belonging to the low quality-of-service class receives a lower resolution image;
  wherein the quality of a version is correlated with a processing time required to create the version; and
  wherein at least a portion of the system comprises a memory and at least one processor coupled to the memory.

23. A method of providing a data serving service, comprising the step of:
  a service provider: (i) generating a plurality of versions of given data in which at least two versions of the given data have different overheads associated therewith, the overhead of a given version of the given data comprising a quantity of processing resources required to serve the given version of the given data; (ii) assigning individual clients to one of a plurality of quality-of-service classes; and (iii) satisfying requests so that a client belonging to a high quality-of-service class is given preferential access to data versions which require higher overheads to serve while a client belonging to a low quality-of-service class receives a data version which requires lower overhead to serve;
  wherein the overhead to serve a version is correlated with a quality of the version;
  wherein the plurality of versions comprise images of different resolutions and clients belonging to the high quality-of-service class are given preferential access to higher resolution images while a client belonging to the low quality-of-service class receives a lower resolution image; wherein the quality of a version is correlated with a processing time required to create the version; and
  wherein the step is performed at least in part by at least one processor.

24. The method of claim 23, wherein the data serving service comprises a quality-of-service policy specification.

25. The method of claim 24, wherein the quality-of-service policy specification comprises:
  a plurality of subscriptions, each subscription being specified by content quality and service latency, wherein a limited premium service subscription is served with high content quality in low service latency, a medium service subscription is served with a high content quality or a low service latency, and an unlimited best-effort service subscription is served with unspecified content quality and latency.

26. The method of claim 23, wherein the service provider modifies data content and how the data content is served to clients in response to one or more changing conditions.

27. The method of claim 26, wherein one or more changing conditions comprises a source of a bottleneck.

28. The method of claim 23, wherein the step of assigning individual clients to one of a plurality of quality-of-service classes is based on a client payment.

29. A method of serving data to a plurality of clients, comprising the steps of:
  generating a plurality of versions of given data in which at least two versions of the given data have different overheads associated therewith, the overhead of a given version of the given data comprising a quantity of processing resources required to serve the given version of the given data;
  establishing at least two quality-of-service classes; and
  satisfying requests so that a client belonging to one quality-of-service class is served with one version of the given data having one overhead associated therewith, while a client belonging to another quality-of-service class is served with another version of the given data having another overhead associated therewith;
  wherein the overhead of the given version of the given data is correlated with a quality of the given version;
  wherein the plurality of versions of the given data comprise images of different resolutions and clients belonging to the high quality-of-service class are given preferential access to higher resolution images while a client belonging to the low quality-of-service class receives a lower resolution image;
  wherein the quality of the given version is correlated with a processing time required to create the given version; and
  wherein the steps are performed at least in part by at least one processor.

30. The system of claim 22, where the at least one back-end server comprises:

at least a first back-end server for generating a first version of the given object; and at least a second back-end server for generating a second version of the given object;

wherein the first and second versions of the given object have different overheads associated therewith.

31. The method of claim 29, wherein the one version of the given data is served by one back-end server while the other version of the given data is served by another back-end server.

\* \* \* \* \*